3,408,228
ELECTRICAL INSULATING BODIES
Shaun Maturin Cox, South Shields, England, assignor to National Research Development Corporation, London, England
No Drawing. Filed Feb. 24, 1965, Ser. No. 435,084
10 Claims. (Cl. 117—227)

The present invention relates to electrical insulating bodies.

It is a practice to use bodies of glass or other ceramic materials to support the functional parts of various kinds of electrical components, more particularly components of electronic circuits, such as resistors, capacitors and printed circuits themselves, with a view to ensuring a rigid and permanent form of a component or rigid and permanent forms and relationship of a plurality of components. For example, a common form of resistor comprises a glass or porcelain rod or tube having deposited on a surface a conductive film which is cut to a form providing a path of desired resistance between associated terminals, the ceramic body affording to the insubstantial film rigidity and permanence that it does not inherently possess. It has further been proposed to form more complex electrical components or assemblies or components by depositing on a glass or other ceramic substrate, in vacuo, films having suitable electrical properties in sequence and through stencils to determine the forms and positions of the several films, thereby producing components such as capacitors and resistors and by the same means providing interconnecting conductive paths, the ceramic substrate affording rigidity and permanence to the assembly as a whole. Again, when it is required to enclose such components in a metal or other canister it is a common practice to seal the electrical connecting leads through glass or ceramic beads where they pass through the walls of the canister, such beads serving to support the leads in electrical isolation. Glass is the preferred substrate or insulator because of its smooth surface and imperviousness and its capacity of being softened by heating so that it can be moulded and sealed.

It has however been found that common and readily available glasses are not as inert as is required, and that they show time-delayed changes which affect the stability of deposited film electrical components. Thus in resistors there is observed a drift in the resistance value attributable to the presence of the substrate, and in other devices a deterioration which is detrimental to the performance of the devices, for example, in surface resistivity of the substrate when its insulating property is of importance. It is believed that such efforts are due to a slight mobility of ions, particularly alkali ions in the glass, and proposals have been made to use a glass substantially free from alkali ions. Such alkali free glasses are however costly and in general not so easily worked as common glass. It has also been proposed to dealkalise the surface layer of common glass, but this effects only a temporary improvement since in time and particularly when heated (for example, by applied resistive components) the surface layer becomes recharged with alkali ions which migrate from the body of the glass.

The invention has for an object to provide an improved substrate for supporting electrical components of the deposited film type.

Another object of the invention is to provide improved insulation resistance of glass or ceramic insulators, sealing beads and the like.

The invention provides means whereby the relatively mobile alkali ions in the surface of the glass or ceramic are replaced by a layer substantially impenetrable by such mobile ions. It has been found that resistor substrates treated in accordance with this invention impart enhanced stability to the resistors so that their performance may be made more consistent and stable than is found if a costly glass, nominally alkali free, is used.

It is known that the alkali ions in a glass surface may be relatively easily exchanged, for example, by hydrated protons if the glass is heated in contact with water, or by calcium ions if the glass is heated in contact with lime. Either of these substitutions usually have a beneficial effect on the surface insulation properties of the glass, which is, however, only temporary and, as might be expected, the easier the initial substitution the more readily does the glass subsequently revert to its normal condition. It has now been found that if after making the substitution the nature of the intruding ions is changed so as to make them less mobile very substantial improvements can be made in the electrically resistive qualities of the glass surface and that these are of a permanent nature.

According to the present invention, a process for the production of electrically insulating bodies includes the steps of heating a glass or ceramic body in contact with a metallic salt so that an exchange takes place between alkali ions in the surface layer of the body and metal ions, removing the contacting salt by a suitable reagent such as hydrochloric acid, and heating the body in a reducing atmosphere. Preferably, said reducing atmosphere consists of or includes hydrogen.

In the case of the metal being copper exchange between the alkali ions and the copper ions can usually be discerned by a faint yellow, green or blue coloration in the ceramic surface and the end of the process can be recognised by a ruby colour which develops in the body. This ruby colour is assumed to be associated with the reduction of the copper ions to neutral copper metal. The surface layer of a glass or the glazed surface layer of another ceramic then exhibits the sought-for improvement in electrical properties and this appears to be permanent at all temperatures which lie within the normal limitations of the glass.

Apparently, the mechanism of the change is as follows. In normal glasses the preponderant alkali ion is sodium. Cuprous ions have a similar electrical charge to sodium ions and are similar (though somewhat larger) in size and therefore readily exchange with them at the glass surface when there is excess of copper. Copper ions however are readily reduced so that the substituted copper ions are reduced to copper atoms to a depth, in a surface which contains them, determined by the extent to which, say, hydrogen diffuses into the glass. Within this depth therefore the mobile sodium ion is replaced by a neutral copper atom which is neutral in charge and larger in size so that on the one hand it has no tendency to move in an electric field and on the other a reduced tendency to diffuse. Furthermore, since these immobile copper atoms tend to occupy the normal migration paths the underlying sodium ions are prevented from movement to the surface.

It has been found that similar effects can be brought about by the use of silver and gold salts in place of copper. However, on the grounds of cost and more particularly since the cuprous ion so closely matches the most commonly present alkali ion in the glass, it is preferred to use copper.

It might be thought that the introduction of metal into the surface of the glass would cause electrical conduction and thereby reduce the performance of the insulator. It seems however, that the dispersion of the metal is such that this does not come about, or at least can be prevented. If the treatment in a reducing gas is carried out at too high a temperature or for too prolonged a period, glasses rich in substituted copper, i.e. glasses originally high in alkali, tend to develop a muddy appearance which is thought to be due to the aggregation of the copper atoms. Since on the one hand this condition is readily visible and on the other the development of the ruby coloration which denotes the immobilisation of the substituted copper is also readily visible a time and temperature suitable for a particular glass can readily be established, i.e. a time and temperature which gives a good transparent coloration. In the use of silver the corresponding colour is a transparent amber.

The initial step of the process i.e. the substitution of a reduceable metal ion for the alkali ion, can be carried out by any means in which the glass or ceramic is heated in contact with a salt of the metal. The salt may be mixed with an inert material to form a paste or slurry which is applied to the glass and after drying fired for a time and temperature determined by trial to suit the particular glass or ceramic, or the glass may be heated in molten cuprous chloride, with or without calcium chloride to assist in maintaining its fluidity.

In determining a suitable time-temperature schedule a useful guide is the electrical resistance of the original material since this indicates the mobility of the alkali ions and therefore the ease with which they may be substituted. Thus for example a treatment for half an hour at a temperature at which the resistivity is $10^6$ ohms can serve as a useful initial trial upon the results of which a more suitable schedule may be chosen.

In regard to the range of materials to which this process may be applied, in all cases of common glasses and dense ceramic materials which have been tried, considerable improvement has been found to result. In general poor materials having the most to gain show the greatest relative improvement. It seems probable that in the case of ceramic materials the glassy material or bond is the seat of the surface conduction and the improvement obtained is through the substitution of residual alkali in this glass.

This invention is not limited to application to registers but is also applicable to glass or ceramic materials used in making insulating bodies. These may either be beads surrounding the conductor for supporting and isolating it when passing through a metal structure or in the form of upstanding or depending supports with the conductor attached at one end. In both these types of insulator it is important that paths of lower resistance should not build up on its surface.

As illustrations of the practice of this invention some examples are given below of the improvements obtained in the case of glasses whose compositions as stated by the manufacturers are as follows:

|  | Class A | Class B | Class C | Class D (Alkali Free) |
| --- | --- | --- | --- | --- |
| $SiO_2$ | 71.5 | 65.0 | 80.8 | 54.5 |
| $Al_2O_3$ | 2.2 | 2.2 | 2.1 | 23.5 |
| $Na_2O$ | 14.0 | 4.0 | 4.2 |  |
| $K_2O$ | 1.5 | 4.2 |  |  |
| BaO | 1.7 |  |  | 6.3 |
| CaO | 5.7 |  |  | 11.3 |
| MgO | 3.0 |  |  | 0.5 |
| $P_2O_5$ |  |  |  | 3.8 |
| $B_2O_3$ |  | 23.0 | 12.9 |  |

Resistors were made by a known method by laying down films of tin oxide and antimony oxide by subjecting the glass at 700° C. to the vapours from a solution of tin and antimony chlorides so that films of approximately 200 ohms per square of small temperature coefficient were obtained.

Further sample resistors were similarly prepared on glasses A, B and C which however were treated in accordance with this invention, viz., the glass was immersed in molten CuCl at about 400° C. for 5 minutes and after washing in HCl solution heated at about 600° C. in an atmosphere of town gas containing hydrogen until the ruby coloration developed.

The resistors which were in the form of hollow tubes with the conductive element applied to the inner surface, were fitted with deposited silver terminations and spiralled internally to give resistance values of about 3,000 ohms.

The resistors were then mounted in a small furnace which was controlled in temperature. Wires making electrical connection with the resistor terminations were led out to enable the resistance of each resistor to be continuously recorded in known manner and thus the stability behaviour determined. In general the resistance value of any temperature is a complex function of time and the previous history of the resistor and any one figure can only crudely represent the performance of the resistor; subject to this qualification, percentage variations which occurred in 10 hours after cooling from 500° C. to 150° C. which illustrate the marked improvement in the treated substrate glasses as compared with untreated substrates, were noted as follows:

|  | Glass A | Glass B | Glass C | Glass D |
| --- | --- | --- | --- | --- |
| Untreated, percent | 20 | 8 | 12 | 1.15 |
| Treated, percent | 1.5 | 0.7 | 0.8 |  |

It will be seen that even the poorest of these glasses has been brought to behaviour comparable with that of an alkali free glass D. This result is the most significant in that prolongation of the test period shows that whereas the changes are substantially worked out in the cases of glasses A, B and C, this is not the case for the untreated glass D which showed a further drift in value of 2% after 100 hours at 150° C.

As an example of the merits of the process in improving surface resistance, a sample of glass A in the form of a short tube 5 mm. dia. was fitted with two conductive rings of silver separated by 5 mm. The sample was mounted in a chamber controlled at 35° C. and air of varying relative humidity was passed over it. Wire connections to the conductive bands was led out to enable the insulation resistance of the intervening glass surface to be measured. The surface resistance was measured continuously, while the humidity was cycled from 0 to over 100% R.H. When dry the resistance was $1.2 \times 10^{11}$ ohms but as the R.H. approached 50% the resistance dropped precipitously and was less than $10^7$ ohms at 100% R.H. As the cycling was repeated the insulation resistance when dry deteriorated and was only $6 \times 10^{10}$ ohms after 14 cycles.

A similar sample but in which the glass A was treated in accordance with this invention was similarly tested. When dry the resistance was $5 \times 10^{11}$ ohms and this was preserved until the R.H. reached 87%. When condensation occurred at over 100% R.H. the insulation resistance only dropped to $3 \times 10^{10}$ ohms and there was no sign of deterioration in performance throughout 10 cycles.

What I claim is:

1. A method of stabilizing the resistivity of an electrical insulator substrate surface comprising alkali glass, said process comprising the steps of heating said entire surface in contact with a salt of a metal selected from the group consisting of silver, copper, and gold to effect an exchange of alkali ions with ions of said metal wherein said metal ions replace alkali ions of the alkali glass of said entire surface, removing said salt from said surface, and heating said entire surface in a gaseous reducing atmosphere to reduce said metal ions to neutral metal to stabilize the resistivity of said insulating body.

2. A process according to claim 1 wherein said surface consists essentially of an alkali glass containing ceramic.

3. A process according to claim 1 wherein said surface consists essentially of alkali glass.

4. A process according to claim 1 wherein said salt is removed from said surface by washing said surface with a mineral acid.

5. A process according to claim 1 wherein said salt comprises cuprous chloride.

6. A process of stabilizing the resistivity of an electrical insulator body, the entire surface of which comprises alkali glass, said process comprising the steps of contacting the entire surface with a salt of a metal selected from the group consisting of silver, copper, and gold, subsequently heating said entire surface while in contact with said metal salt to effect an exchange of alkali ions with ions of said metal wherein said metal ions replace alkali ions of the alkali glass of said entire surface, removing said salt from said surface, and heating said entire surface in a gaseous reducing atmosphere to reduce said metal ions to neutral metal to stabilize the resistivity of said insulating body.

7. A process according to claim 6 wherein said surface consists essentially of an alkali glass containing ceramic.

8. A process according to claim 6 wherein said surface consists essentially of alkali glass.

9. A process according to claim 6 wherein said salt is removed from said surface by washing said surface with a mineral acid.

10. A process according to claim 6 wherein said salt comprises cuprous chloride.

References Cited
UNITED STATES PATENTS

| | | | |
|---|---|---|---|
| 2,776,915 | 1/1957 | Van Oosterhout et al. | 117—212 |
| 3,035,944 | 5/1962 | Sher et al. | 117—213 |
| 3,249,467 | 5/1966 | Stookey | 117—212 |

WILLIAM L. JARVIS, *Primary Examiner.*